United States Patent [19]

Wieth

[11] Patent Number: 5,144,517
[45] Date of Patent: Sep. 1, 1992

[54] INTRINSICALLY SAFE BARRIER DEVICE

[75] Inventor: Hermann Wieth, Chagrin Falls, Ohio

[73] Assignee: Pepperl + Fuchs, Inc., Twinsburg, Ohio

[21] Appl. No.: 746,047

[22] Filed: Aug. 12, 1991

Related U.S. Application Data

[63] Continuation of Ser. No. 424,680, Oct. 20, 1989, abandoned.

[51] Int. Cl.$^5$ ............................................. H02H 3/20
[52] U.S. Cl. ....................................... 361/55; 361/56; 361/111; 361/104
[58] Field of Search ...................... 361/56–58, 361/84, 91, 111, 54, 55, 77, 82, 104; 307/127; 340/660, 664

[56] References Cited

U.S. PATENT DOCUMENTS

| | | |
|---|---|---|
| 2,967,991 | 1/1961 | Deuitch . |
| 3,048,718 | 8/1962 | Starzec et al. . |
| 3,098,949 | 7/1963 | Goldberg . |
| 3,158,786 | 11/1964 | Hurtle . |
| 3,218,542 | 11/1965 | Taylor . |
| 3,273,018 | 9/1966 | Goldberg . |
| 3,309,542 | 3/1967 | Elliot . |
| 3,353,066 | 11/1967 | Souza ................................... 361/55 |
| 3,359,457 | 12/1967 | King . |
| 3,409,803 | 11/1968 | De Witt, Jr. . |
| 3,435,294 | 3/1969 | Lemma . |
| 3,456,125 | 7/1969 | Cousin et al. . |
| 3,544,844 | 12/1970 | Pellegrino . |
| 3,551,745 | 12/1970 | Nicholas . |
| 3,582,713 | 6/1971 | Till . |
| 3,684,924 | 8/1972 | Miller, Jr. . |
| 3,818,273 | 6/1974 | Nakashima et al. . |
| 3,887,849 | 6/1975 | Nagel . |
| 3,919,601 | 11/1975 | Suko et al. . |
| 4,063,299 | 12/1977 | Munroe ................................. 361/45 |
| 4,099,216 | 7/1978 | Weberg ................................. 361/56 |
| 4,171,512 | 10/1979 | Tsuda ................................... 324/133 |
| 4,301,403 | 11/1981 | Hawkes et al. ...................... 324/62 |
| 4,587,588 | 5/1986 | Goldstein ............................. 361/56 |
| 4,662,706 | 5/1987 | Foley . |
| 4,763,069 | 8/1988 | Landrini . |
| 4,768,978 | 9/1988 | Wettengel et al. . |
| 4,796,159 | 1/1989 | Milksche ............................. 361/429 |
| 4,831,484 | 5/1989 | Bruch ................................. 361/101 |

FOREIGN PATENT DOCUMENTS

| | | |
|---|---|---|
| 0294139 | 12/1988 | European Pat. Off. . |
| 0310280 | 4/1989 | European Pat. Off. . |
| 0310281 | 4/1989 | European Pat. Off. . |
| 1587681 | 4/1981 | United Kingdom . |

Primary Examiner—Todd E. Deboer
Attorney, Agent, or Firm—Fay, Sharpe, Beall, Fagan, Minnich & McKee

[57] ABSTRACT

An protection barrier provides voltage and current necessarily conveyed to hazardous, such as explosive, areas. The system includes a current sensing circuit which triggers a silicon control rectifier based crowbar circuit in the event over current is detected. This triggering, in turn, trips a relay severing the current path entirely. A reverse polarity circuit provides for immediate clamping of improperly bias connections in a similar crowbar arrangement, and also provides for tripping of the circuit breaker. Thermistors are also provided in current series in the event the circuit breaker fails to trip, or is forcibly bypassed. The circuit breaker additional provides a visual indicator when it is in the tripped position. The intrinsic barrier system is suitable to serving as a first stage protection to zener barrier modules as utilized in the prior art.

22 Claims, 2 Drawing Sheets

INTRINSICALLY SAFE BARRIER DEVICE

This is a continuation of application Ser. No. 07/424,680 filed Oct. 20, 1989 now abandoned.

BACKGROUND OF THE INVENTION

This application pertains to the art of intrinsically safe or protection barrier devices, and more particular to provision of such barrier devices which function in a non-destructive manner.

The application is particularly applicable to provision of electric power to devices disposed within hazardous areas, and will be described with particular reference thereto. It will be appreciated, however, that the invention has broader application, such as in any application in which a device is to be isolated against over voltages, over current, reverse polarity connections, and the like.

Intrinsic safety is generally considered the safest method of supplying electricity to equipment disposed in hazardous areas. Such hazardous areas include highly combustible areas, and include such applications as monitoring devices disposed in fuel storage areas. Such intrinsic barrier devices provide a reliable, less expensive, and more desirable approach to providing power to systems in such areas then are found in the alternatives. Alternatives include such means as encasing an entire system within an explosion proof barrier. Such barriers are obviously bulky, high in weight, and extremely expensive to construct, and maintain.

Presently, several intrinsically safe barrier devices are available. These include "zener barrier modules" which typically include zener diodes, a resistor, and a fuse. The zener diode functions to clamp over voltages. In the event of excessive current or over voltage conditions, the fuse will blow. The blowing of a fuse in such a barrier module typically requires replacement of the entire subsystem, given that a substantial possibility exists that the zener diode, or diodes, were damaged by the clamping action. Such replacement is generally expensive. In addition, there is generally no means to readily discern whether, in fact, a fuse in such a zener barrier module has been blown.

Other attempts have been made to fabricate alternative secure intrinsically barrier devices, typically with systems utilizing a plurality of electronic components. As electronic components themselves require power for operation, other disadvantages arise. In particular, a separate power supply must be provided to the device, or the device is subject to voltage drops between its input and output. Such voltage drops are generally unacceptable, especially in areas where the voltage supplied to the hazardous area must be maintained in close tolerance to generated voltage levels.

The present invention contemplates a new and improved intrinsically safe barrier device which overcomes all of the above-referred problems, and others, and provides a reusable barrier device which is reliable and economical.

In accordance with the present invention, there is provided an protection barrier device which includes first and second input terminals adapted for connection of the device with an associated direct current voltage source. A first series path is provided between the first input terminal and first output terminal. Similarly, a second series path is provided between the second input terminal and second output terminal. A current sensing means is provided to sensing current levels in at least one of the first and second series paths. Means is provided for generating a signal representative of an event in which excessive currents, defined to selected standards, causing a triggering of a crowbar circuit disposed between the first and second series paths. This crowbar circuit, in turn, provides a low resistance current path between the series paths. Current flowing through this crowbar circuit path, in turn, triggers a switching means which functions to impede current flow through at least one of the first and second series paths.

In accordance with a more limited aspect of the present invention, means is also provided for protecting the hazardous area from receiving significant voltage when the first and second input terminals are misswired to reversed potentials.

In conjunction with a yet more limited aspect of the subject invention, a thermistor is disposed in at least one of the first and second series paths, which thermistor functions to minimize current in the event the switching means is bypassed, or fails.

In accordance with another aspect of the present invention, a method of in&rinsic protection for operation of the afore-mentioned means is disclosed.

An advantage of the present invention is the provision of a system which reacts quickly to over current conditions, over voltage conditions, reverse polarity conditions, and short circuit conditions.

Another advantage of the present invention is the provision of a system having a readily discernable visual indicator of when a fault has been detected, and compensated for.

Yet another advantage of the present invention is the provision of a system for intrinsically safe voltage protection which maintains a minimum voltage drop between input and outputs thereof.

Further advantages will be obvious to one of ordinary skill in the art upon a reading and understanding of the subject invention.

BRIEF DESCRIPTION OF THE DRAWINGS

The invention may take physical form in certain parts, and arrangements of parts, preferred and alternate embodiments of which will be described in detail in this specification, and illustrated in the accompanying drawings which form a part hereof, and wherein.

DETAILED DESCRIPTION OF THE PREFERRED AND ALTERNATE EMBODIMENTS

Figure 1:
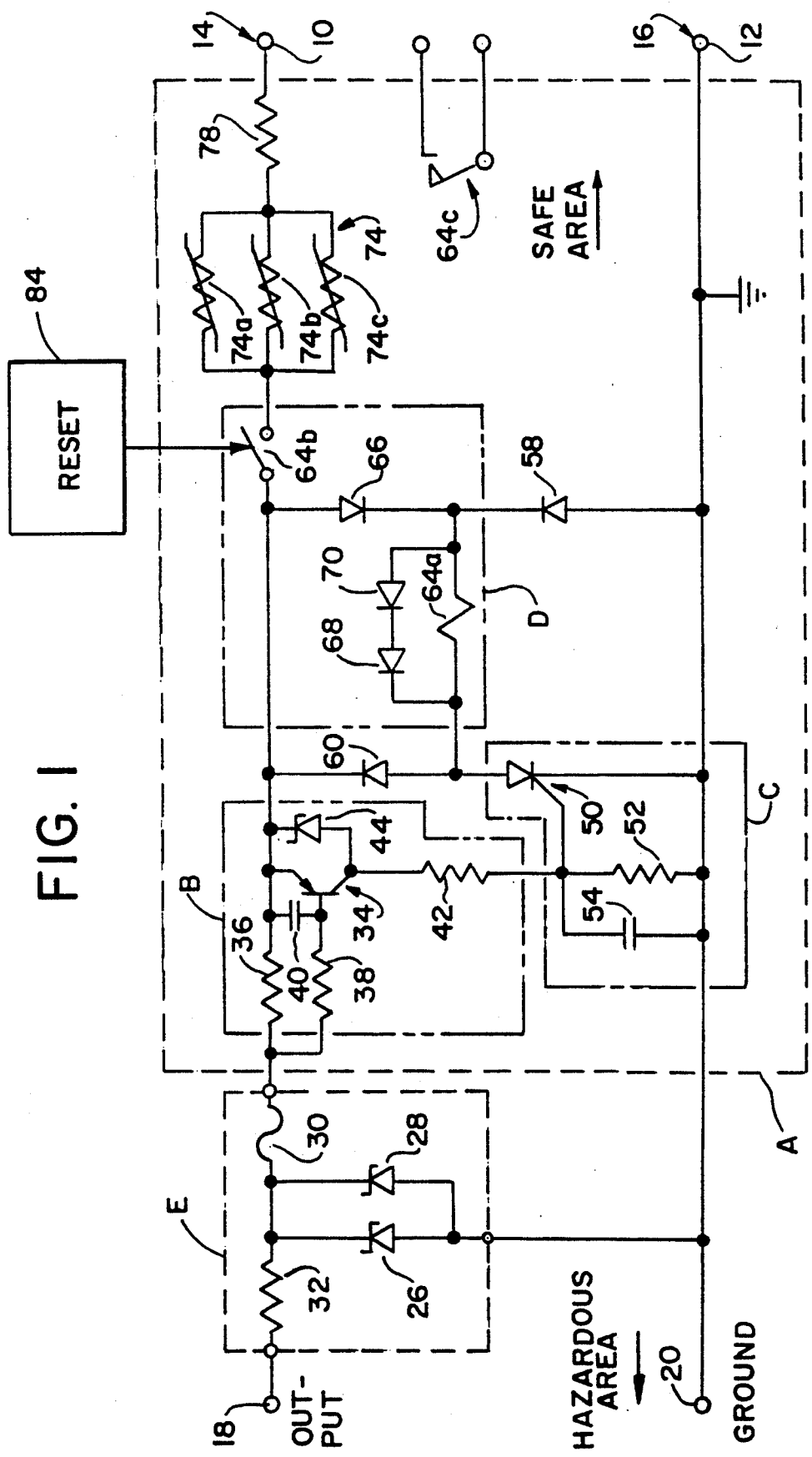
FIG. 1 illustrates, in schematic form, an intrinsically safe barrier circuitry of the subject invention.

Referring now to the drawings wherein the showings are for the purposes of illustrating the preferred and alternate embodiments of the invention only, and not for the purposes of limiting the same, FIG. 1 illustrates an protection barrier circuit A which includes a current detection system B, a quick protection system C, and a long-term protection D. Also illustrated is a zener barrier module E, such as is typically utilized in the prior art.

The circuitry of FIG. 1 includes first and second input terminals or means 10 and 12 respectively. These terminals form first and second current series paths 14 and 16, wit h first and second output terminals 18 and 20, respectively. In the preferred embodiment, the circuitry of FIG. 1, in addition to all circuitry disposed prior to input terminals 10 and 12 is found in a "safe area," defined as an area substantially devoid of combustible fuels, or the like. Output terminals 18 and 20 form and electrical connection to systems disposed in a hazardous area.

The zener barrier module E forms the sole protection in a typical protection barrier device. Included therein is a zener diode which functions to shunt first and second series current paths 14 and 16 in the event of over voltage or over current. Illustrated is first and second parallely mounted zener diodes 26 and 28 so arranged to divide current flow therebetween. It will be appreciated by one of ordinary skill in the art that the zener diode facilitates low resistance conduction once a threshold voltage, determined by diode characteristics, has been achieved. Over current conditions, such as would be introduced after triggering of the zener diodes, causing blowing of a fuse 30. A small voltage drop is introduced into the first series current path 14 by resistor 32.

Although the above-described circuit is functional, no readily available visual indicator of a tripped condition is available. In addition, it is desirable to replace the entire unit after a fuse has been blown in the event that undetectable damage occurred to the zener diodes. The protection barrier circuit A may serve dual capacities. It may serve as a primary protection circuit for zener barrier modules such as that illustrated by E.

The current detection system B is sensitive to current flow through firs& series current path 14. A base of transistor 34 is energized in accordance with a voltage difference dictated by relative values of resistors 36 and 38, and capacitor 40, as will be appreciated by one of ordinary skill in the art. Upon achieving current in current path 14 of a selected level as dictated by this combination, the transistor 34 is caused to conduct through its emitter-collector junction, providing current flow through biasing resistor 42 into the quick protection system C. Zener diode 44 serves to prevent the emitter-collector junction from damage due to transient voltages.

The quick protection system C includes a silicon controlled rectifier ("SCR"), the gate of which is interconnected with an output of current detection system B emanating from resistor 42. The gate is also connected to a parallel resistor-capacitor ("R/C") network form from resistor 52 and capacitor 54. The anode of SCR 50 is electrically connected to first series current path 14 to allow in flow of conventional current thereinto in a fashion which will be described further below. The cathode of SCR 50 is electrically connected to second series current path 16. It will be appreciated that upon triggering of the SCR 50 by application of voltage to its gate lead, a low resistance current path is therefore provided between first series current path 14 and second series current path 16, provided that conventional current flow is in that same direction. This shunting effect is commonly referred to as a "crowbar," thereby providing a common designation of the quick protection system C as a crowbar circuit.

As will be inferred from the above-description, the over current or over voltage problems compensated for by the combination of the current detection system E and quick protection system C are unaccounted for in a reverse polarity situation. That is, in the event conventional current flow was to occur from second input terminal to first input terminal 10, the triggering would not occur. This situation is independently accounted for by diodes 58 and 60, which are mounted, in series, to form a low resistance path for conventional current flow from the second series current path 16 to the first series current path 14. This combination provides quick reverse polarity protection for the intrinsically safe barrier circuit A. Particular interconnections between a cathode of diode 58 and series connected anode of diode 60 will become apparent with the description of long-term protection system D, which follows.

The long-term protection system D includes a current sensitive switching circuit or means 64 which, in the illustrated embodiment, employs a coil portion 64a and a normally closed contact portion 64b. It will be appreciated that current flow of a sufficient magnitude through coil portion 64a results in a tripping, or opening of coil portion 64b thereby causing an effective break in the first series current path 14. Such current may be introduced through coil 64a through diode 66 and SCR 50 upon triggering of the quick protection system C, as described above. Additionally, current flow through coil portion coil portion 64a is induced by reverse polarity connection of input contracts 10 and 12 given that the coils 64a is disposed in current series between an anode of diode 58 and cathode of diode 60. It will therefore be noted that tripping of the switching circuit 64 is accomplished in either condition. In the illustrated embodiment, diodes 68 and 70 are also provided to protect the coil portion 64a from transients and back EMF, as will be appreciated from one of ordinary skill in the art.

It is often desirable that a remote signal be provided evidencing a tripping of a barrier device. Such a signal is suitably provided by an additional pair of contacts 64c on the switching circuit 64. Such contacts add no additional voltage drop across the device, and may be installed as normally open or normally closed as a particular installation may warrant.

In the illustrated embodiment, the switching circuit 64 is comprised of a current operated circuit breaker or relay. As will be noted with FIG. 2, reset switch is also utilized which additionally functions to provide a visual indicator of a tripping thereof. Utilization of a contact device is advantageous given that essentially no voltage drop is experienced across the contacts. It will also be appreciated that other suitable switching means, such as transistors and especially field effects transistors may be suitable utilized in place of the illustrated breaker. With present technology, some voltage drop will be experience with most semi-conductor elements used for such switching purposes. It is envisioned that certain application may not be voltage sensitive allowing for the use of such elements or further advances in fabrication will minimize losses to within acceptable levels. When such semi-conductor elements are utilized as the switching means, an additional signaling device, such as a light-emitting diode, or the like, are advantageously used to replace the visual indicator provided by the circuit breaker in the illustrated embodiment.

A thermistor network 74 is also advantageously applied in the circuit, and is illustrated in first series current path 14. It will be appreciated that such thermistors maintain a resistance proportional to temperature. A suitable thermistor is defined as having a normal resistance in around 3 Ω, and a high temperature resistance of over 20 kΩ in overheated conditions induced by excessive current flow therethrough. The thermistor network 74 is provided as a fail-safe mechanism in the event that the switching circuit 64 is forcibly shorted, notwithstanding an otherwise open condition, or in the event the element fails, in its entirety. In the illustrated embodiment, three parallely mounted thermistors 74a, 74b, 74c are utilized to minimize current handling requirements of any of the thermistors, individually. Finally, a small input resistor 78 is provided to provide nominal isolation of the protection barrier circuit A from the actual power generating system. A suitable resistance value of 10Ω provides nominal voltage losses in typical ranges (50mA) passed by the barrier device, but dissipates considerable power in excess current situations.

It will be seen from the figure that the illustrated components provide for quick protection for over voltage or over current condition by interaction of the current detection system B and the quick protection system C. Reverse bias protection is afforded by interaction of the diodes 58 and 60. Reverse polarity connections, or tripping of the quick protection circuit C result in opening first series current path 14 via long-term protection system D. A visual indicator is provided in the event the long-term protection system D has been utilized. The system is resettable after tripping to eliminate the necessity of component replacement. Finally, thermistor network 74 provides a fail-safe mechanism in the event of bi-passing the protection system, or failure of selected components thereof. The system is envisioned to be usable in and of itself, or as a protection system to prevent destruction of zener barrier modules, such as zener barrier module E.

Figure 2:
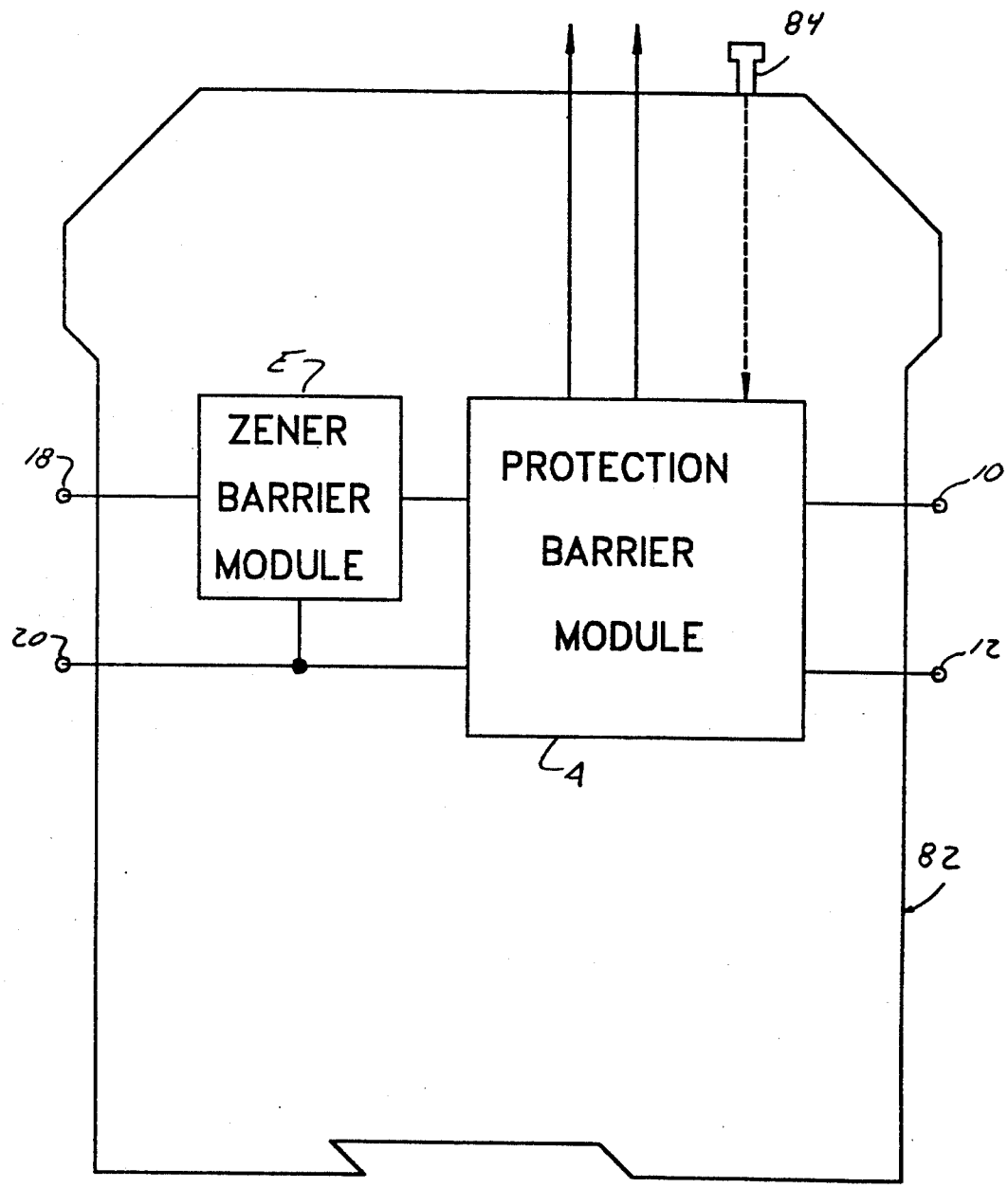
FIG. 2 illustrates, in block diagram form, a protection barrier module including the circuitry of FIG. 1.

Turning briefly to FIG. 2, illustrated is the protection barrier circuit A and the zener barrier module E of FIG. 1 secured within a housing 82, to facilitate removal or replacement in mounting brackets such as are commonly used in the field. It will be apparent from the figure that no additional power supply is necessary to accomplish the functions of the subject system. Also illustrated is a reset button or means 84 which interacts with the contacts 64a (FIG. 1) for resetting of the switching circuit, and also provides a visual indicator of when the system lies in the a tripping condition. In the event that non-mechanical switching means is implemented, the indicator 84 is suitably replaced with a visual indicator such as a light emitting diode, or like.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A protection barrier device comprising:
   first and second input terminals adapted for connection of the device with an associated direct current voltage source;
   first and second output terminals adapted for connection of the device with an associated device disposed in a hazardous area, the first output terminal being in a first low-impedance series path with the first input terminal and the second output terminal being in second low-impedance series path with the second input terminal;
   current sensing means for sensing current in at least one of the first and second series paths;
   excess current level signal generating means for generating an excess current level signal in accordance with a sensed excess current level consisting of current in excess of a pre-selected level;
   amplifier means, powered at least in part by excess current in at least one of the first and second series paths, for amplifying the excess current level signal provided by the excess current level signal generating means to form a trigger signal;
   crowbar circuit means for providing a low resistance crowbar circuit current path between the first and second series paths in accordance with the trigger signal; and
   switching means for impeding current flow through at least one of the first and second series paths in accordance with current passing through the crowbar circuit current path.

2. The protection barrier device of claim 1 further comprising reverse polarity protection means for providing a low resistance reverse polarity current path between the first and second series paths in an event wherein a voltage potential thereacross is inverted.

3. The protection barrier device of claim 2 wherein the switching means includes means for impeding the current flow through at least one of the first and second series paths in accordance with current passing through the reverse polarity current path.

4. The protection barrier device of claim 3 further comprising means for enabling a remote indicator representative of a state of the switching means.

5. The protection barrier device of claim 3 further comprising thermistor disposed in at least one of the first and second series paths.

6. The protection barrier device of claim 5 wherein the switching means includes a relay, a trigger mechanism of which is disposed in the crowbar circuit current path and the contacts of which ar disposed in at least one of the first and second series paths.

7. The protection barrier device of claim 6 wherein the relay is formed as a circuit breaker having a visual indicator representative of a tripped condition.

8. The protection barrier device of claim 7 wherein the crowbar circuit means includes a silicon controlled rectifier triggered by/the excess current level signal.

9. The protection barrier device of claim 8 wherein the current sensing means includes a transistor, the emitter-collector junction of which forms a path between one of the first and second series paths and a gate lead of the silicon controlled rectifier.

10. The protection barrier device of claim 9 further comprising a zener barrier module disposed across the output terminals, the zener barrier including a fuse element in one of the first and second series paths, and a zener diode disposed between the first and second output terminals.

11. A protection barrier device comprising:
   first and second input terminals adapted for connection of the device with an associated direct current voltage source;
   first and second output terminals adapted for connection of the device with an associated device disposed in a hazardous area, the first output terminal being in a first low-impedance series path with the first input terminal and the second output terminal being in second low-impedance series path with the second input terminal;
   current sensing means for sensing current in at least one of the first and second series paths;
   excess current level signal generating means for generating an excess current level signal consisting of current in excess of a preselected level;

amplifier means, powered at least in part by excess current in at least on of the first and second series paths, for amplifying the excess current level signal provided by the excess current level signal generating means to form a trigger signal;

crowbar circuit means for providing a low resistance crowbar circuit current path between the first and second series paths in accordance with the trigger signal;

reverse polarity protection means for providing a low resistance reverse polarity current path between the first and second series paths in an event wherein a voltage potentials thereacross is inverted; and switching means for impeding current flow through at least one of the first and second series paths in accordance with current passing through at least one of the crowbar circuit current path and the reverse polarity current path.

12. The protection barrier device of claim 11 further comprising indicator means for providing a visual indication of when current flow through at least one of the first and second series paths has been impeded by action of the switching means.

13. The protection barrier device of claim 12 wherein the switching means includes a circuit breaker, a trigger of which is disposed in the crowbar circuit current path and the reverse polarity current path, and wherein a contact portion of the circuit breaker is disposed in at least one of the first and second series paths.

14. The protection barrier device of claim 13 further comprising a thermistor mounted in at least one of the first and second series paths.

15. The protection barrier device of claim 14 wherein the crowbar circuit means includes a silicon controlled rectifier disposed such that its anode extends to one of the first and second series paths and its cathode extends to the other of the first and second series paths, and wherein its gate is adapted for receiving the excess current level signal.

16. The protection barrier device of claim 15 further comprising a zener barrier module disposed across the output terminals, the zener barrier including a fuse element in one of the first and second series paths, and a zener diode disposed between the first and second output terminals.

17. A method for controlling electricity levels communicated to a hazardous area comprising the steps of:

sensing current in at least one of first and second series paths, the first non-inductive series path extending between a first input terminal and a first output terminal of an protection barrier device, and the second non-inductive series path extending between a second input terminal and a second output terminal of the protection barrier device;

generating an excess current level signal in accordance with a sensed current level in excess of a selected current level;

amplifying the excess current level signal to form a trigger signal;

selectively providing a low resistance crowbar current path between the first and second series paths in accordance with the trigger signal;

selectively providing a low resistance reverse polarity current path between the first and second series paths in an event wherein a voltage potentials thereacross is inverted; and impeding current flow through at least one of the first and second series paths in accordance with current passing through at least one of the crowbar circuit current path and the reverse polarity current path.

18. The method of claim 17 further comprising the step of enabling a remote indicator representative of an impeded current flow through at least one of the first and second series paths.

19. The method of claim 17-further comprising the step of providing a visual indication of when current flow through at least one of the first and second series paths has been impeded by action of the switching means.

20. The method of claim 19 wherein the step of selectively providing a low resistance crowbar circuit includes the step of triggering a silicon control rectifier, the anode and cathode of which form a portion of the crowbar current path.

21. The method of claim 20 wherein the step of selectively providing a low resistance crowbar current path is completed prior to completion of the step of impeding current flow through at least one of the first and second series paths.

22. The method of claim 21 further comprising the step of clamping the anode and cathode to a generally equivalent potential upon completion of the step of impeding current flow through at least one of the first and second series paths.

* * * * *